United States Patent [19]
Allemand et al.

[11] 4,455,087
[45] Jun. 19, 1984

[54] MONOCHROMATIC IMAGING APPARATUS

[75] Inventors: Charly D. Allemand, Newtownville; David L. Brewer, Stow, both of Mass.

[73] Assignee: Hamamatsu Systems Inc., Waltham, Mass.

[21] Appl. No.: 251,143

[22] Filed: Apr. 6, 1981

[51] Int. Cl.³ .............................................. G01J 3/18
[52] U.S. Cl. .................................................. 356/333
[58] Field of Search ............... 356/301, 333, 334, 332, 356/331; 350/162.17, 162.23

[56] References Cited

U.S. PATENT DOCUMENTS 3,586,442 6/1971 Tripp .................................... 356/333
3,664,742 5/1972 Witte et al. ......................... 356/332

FOREIGN PATENT DOCUMENTS 754220 8/1980 U.S.S.R. .............................. 356/333

OTHER PUBLICATIONS

Murty, *Applied Optics*, Jul. 1972, vol. 11, No. 7, pp. 1637, 1638.
Peisakhson, *Sov. J. Opt. Technol.*, vol. 47, No. 2, Feb. 1980, pp. 73, 74.
Murty, *Applied Optics*, vol. 11, No. 10, Oct. 1972, pp. 2286–2288.

*Primary Examiner*—F. L. Evans
*Attorney, Agent, or Firm*—Irving M. Kriegsman

[57] ABSTRACT

A monochromatic imaging apparatus comprising a pair of similar diffraction gratings, a pair of focusing lenses, a pair of collimating lenses, an entrance slit, an exit slit and an intermediate slit, and means for concurrently moving the two gratings; wherein a polychromatic source image is placed at the entrance slit, and a collimating lens collimates the light rays from the source image and projects the collimated rays onto the first diffraction grating thereby to disperse the rays. The dispersed rays are then focused by the first focusing lens onto the intermediate slit, and then collimated by the second collimating lens onto the second diffraction grating which thereupon recombines the dispersed light. The recombined rays are then focused by the second focusing lens onto the exit slit. The two gratings may be concurrently moved in opposite or similar directions about an axis in the grating ruling plane and at the centers thereof, and at similar angles, so that the angle of incidence at the first grating is equal to the angle of diffraction at the second grating. In this manner, a monochromatic image of the polychromatic source image will appear at the exit slit and be of a selected band of wavelengths of the visible or other spectrum dependent upon the angular position of the two gratings from zero order of diffraction.

7 Claims, 1 Drawing Figure

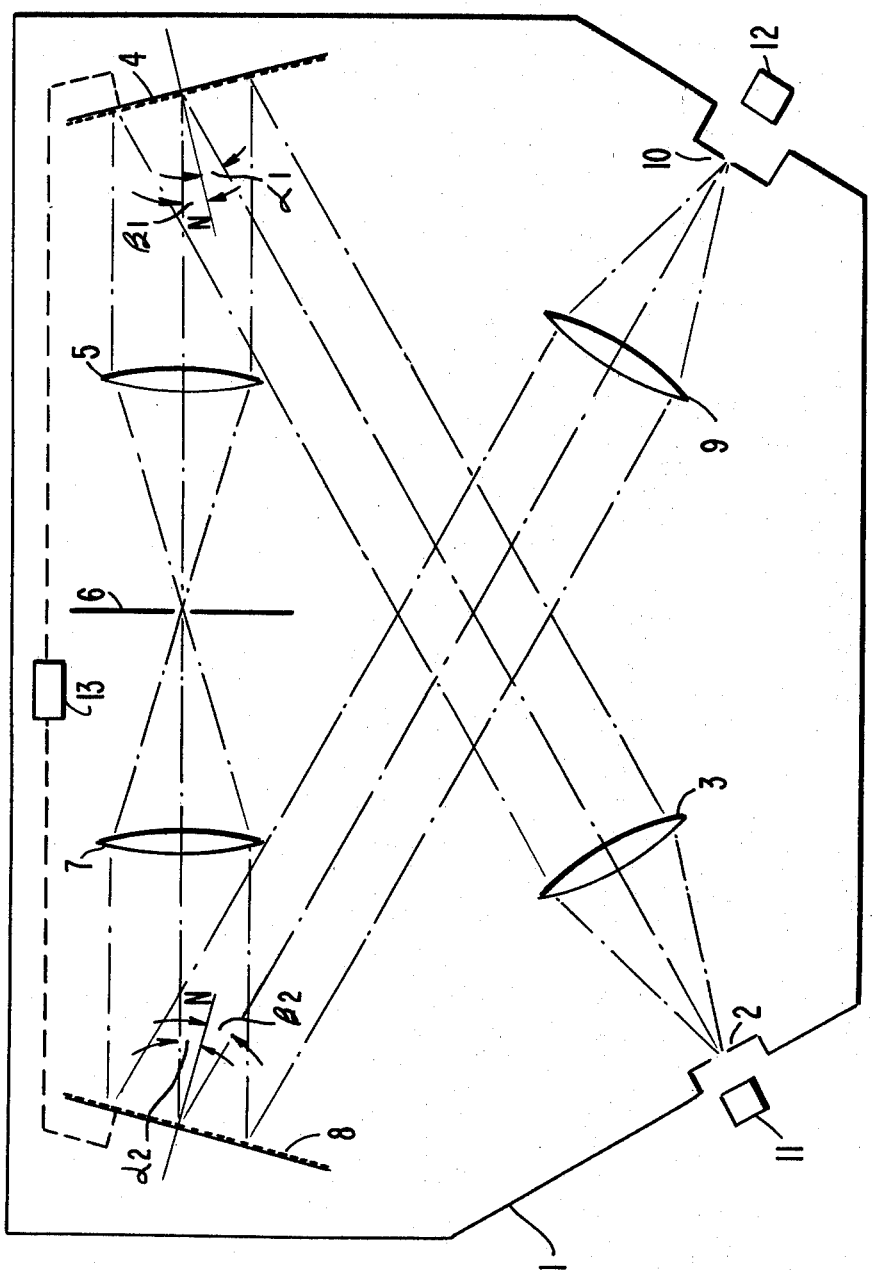

MONOCHROMATIC IMAGING APPARATUS

BACKGROUND OF THE INVENTION

This invention relates to an imaging apparatus which produces a monochromatic image of a selected band of wavelengths from a polychromatic source image, and more particularly, to such an apparatus wherein a pair of monochromators are utilized therein.

In the prior art, there are known two types of double monochromators, one of which has been used for imaging purposes. In that instrument, it was only possible to reproduce an image at only one wavelength, to any degree, and not over a selected band of wavelengths. For example, for use in human spectroscopy, an isolated spectral line was possible of isolation and viewing. However, in the art, there is no apparatus which can by simple manipulation, view a polychromatic source image, as well as a monochromatic image of any selected wavelength or band of wavelengths, with faithful reproduction of the source image.

It has been known to use a double monochromator as a scanning spectrometer wherein an entrance slit, collimating mirror, grating, camera mirror, intermediate slit, second collimating mirror, second grating, second focusing mirror and exit slit were employed. In this prior spectrometer, the slits were extremely narrow so as to produce a precise one dimensional resolution of the spectral lines. However, there has not yet been produced a monochromatic imaging device wherein an accurate reproduction of the source image was produced and of a selected single wavelength or band of wavelengths.

SUMMARY OF THE INVENTION

Accordingly, an object of the invention is to overcome the foregoing and other deficiencies and disadvantages of the prior art.

Another object is to provide a monochromatic imaging apparatus wherein by simple manipulation of the gratings of a double monochromator, an accurate monochromatic image is produced of a polychromatic source image and of a selected single wavelength or a band of wavelengths within the spectrum of the source image.

The foregoing and other objects and features of the invention are attained in the invention which encompasses a double or multiple monochromator comprising two similar diffraction gratings or a suitable number of gratings, two or suitable number of similar collimating lenses, two or suitable number of similar collimating lenses, two or a suitable number of similar focusing lenses, an entrance slit, an exit slit and a suitable number of intermediate slits with means for selectively and concurrently moving the two gratings, disposed as follows: The entrance slit is positioned in front of a first collimating lens which focuses on the polychromatic source image at the entrance slit, and collimates the light rays from the source object image onto the first grating, which disperses the light. The first focusing lens focuses the dispersed light from the first grating onto the intermediate slit. The second collimating lens then collimates the dispersed light passing through the intermediate slit onto the second grating, which thereupon recombines the dispersed light (that is, disperse same in the opposite direction). The recombined light is then focused onto the exit slit. The two gratings are movable in opposite or similar directions rotated about their axis at the ruled surface plane and at the centers thereof, and preferably so that the angle of incidence at the first grating is equal to the angle of diffraction at the second grating. The intermediate slit is of suitable dimensions so as to pass the desired bandwidth and image.

In this manner, by suitable movement of the two gratings, an accurate image of the source image will appear at the exit slit, and be of a selected single wave length or band of wave lengths within the band of wavelength spectrum of the polychromatic source image. The exit slit image will be an accurate proportional reproduction of the dimensions of the source image since there will be two dimensional spatial resolution. For example, employing this invention, it would be possible to obtain, an accurate image at the exit slit of the source image in, for example, a green color, and then by suitable movement of the two gratings, view the same image in a yellow color. The same would be possible in UV and other wavelengths. Accordingly, this invention is highly useful and has many different applications, such as for example, in identifying and spatially locating different components of a vapour or other material composition.

A feature of the invention is the double monochromator wherein to similar diffraction gratings are interconnected to move concurrently about their respective axis disposed at the ruling plane and at the centers thereof, so that the angle of incidence of the first grating closest to the source object is equal to the angle of diffraction of the second grating closest to the final image.

Another feature is the two dimensional resolution of the apparatus, wherein high resolution lenses are employed to project images in two dimensions accurately, and wherein suitable dimensioned slits are employed to pass two dimensions of the source image.

A further feature is the use of two similar gratings and concurrent movement of the two gratings in opposite directions from the zero order position and at the same angle to thereby diffract and then recombine light waves, with an intermediate slit disposed therebetween for selective control of the bandwidth of light waves being transmitted.

Another feature is use of an entrance slit and exit slit of sufficient width to enable passage of desired light from an object image without passage of extraneous light.

Another feature is the use of a lighttight housing for a double monochromator to prevent extraneous light from entering the light paths being processed.

BRIEF DESCRIPTION OF THE DRAWING

The sole FIGURE depicts in plan view an illustrative embodiment of the invention, and in diagram form the light rays as acted thereon.

DETAILED DESCRIPTION OF THE PREFERRED EMBODIMENTS

Turning now to the drawing, there is depicted an imaging arrangement according to the invention, comprising a light and dust tight housing 1, wherein are disposed, an entrance slit 2, a collimating lens 3, a diffraction grating 4, a focusing lens 5, an intermediate slit 6, a collimating lens 7, a second diffraction grating 8, a focusing lens 9 and an exit slit 10, and interconnection and moving device 13 which interconnects for concurrently movement of the gratings 4 and 8, as depicted. A viewer 12 is focused to view the resulting image at the exit slit 10. A polychromatic color source 11 may be used to project a polychromatic source image onto the entrance slit 2.

The source image is focused at the entrance slit 2 by the image producer 11, which may be a TV camera lens, and then the light therefrom is collimated by collimating lens 3 onto the first diffraction grating 4. The grating 4 diffracts the light and disperses same toward the focusing lens 5, which then focuses the dispersed light onto the intermediate slit 6. The dispersed light passes through the intermediate slit 6 and is then collimated by collimating lens 7 onto the second diffraction grating 8. All of the wavelengths of the polychromatic source image are spread out on the plane of the intermediate slit, the depending upon the angular position of the grating 4, selected wavelengths will pass through the intermediate slit 6. As will be seen in the later discussions, in this manner, selected bands or band of wavelengths will appear at the exit slit. The second grating 8, then diffracts the already dispersed light in the opposite direction, that is to say, the second grating 8 then recombines the dispersed light which reaches it. The recombined light is then focused by focusing lens 9 onto the exit slit 10, to produce an image thereat which is an accurate reproduction of the object image appearing at the entrance slit 2, but of a selected wavelength or band of wavelenghths within the spectrum of wavelengths of the source image. The source image at the entrance slit 2 may be polychromatic. The spectrum of the source image may be of any suitable band, such as within the visible and up to IR, or up to X-ray on the other end. The exit image, advantageously, will be proportional in dimension and be an accurate reproduction of the image, with only the color, that is the wavelength of the light being different from the source image, with the exit image wavelength being a single wavelength or a band of wavelengths within the spectrum of wavelengths of the source image. As will be discussed, by suitable movement of the device 13, the two gratings 4 and 8 can be moved concurrently in opposite or similar directions so that the angle of incidence at the grating 4 will equal the angle of diffraction at grating 8, and so that the particular wavelength which passes through the intermediate slit 6 will be that which is desired to be shown at the exit slit. For example, if the color yellow is desired at the exit slit image, the moving device 13 will move the two gratings 4 and 8 such that such yellow band will pass through the intermediate slit 6 and exclude the others, and then such yellow band will appear at the exit slit image.

As shown in the sole FIGURE, the two gratings 4 and 8 are connectable together for concurrent movement by device 13. The gratings have their axis on the grating ruled plane and located substantially at the horizontal centers thereof. The gratings may be of any suitable size in terms of number of grooves and total surface area. The two diffraction gratings 4 and 8 should be of the same size and groove density, although the invention will still be operative with variations in the two. When devices 13 moves the two gratings concurrently, two functions are served: first, the wavelength or band of wavelengths which will be passed through the intermediate slit 6 is determined. This is done by the angular position of the grating 4; with the entire spectrum being spread throughout the plane of the intermediate slit 6, positioning the grating 4 will determine which band of wavelengths will be at the position of the slit and thus be passed thereby. Second, the two gratings will be moved such that grating 4 will be moved in an opposite or similar rotating direction from grating 8, and such that all the time the angle of incidence at grating 4 will equal the angle of diffraction at grating 8. In this second function, the grating 4 will disperse the image, and the grating 8 will disperse the image in the opposite direction, or to put it another way, recombine the dispersed light which passes though the intermediate slit 6.

The connecting device 13 (which also causes the movement of the gratings) can be of any mechanical means, such as employing connecting arms together with a screw adapted interconnection for appropriate moving of both gratings 4 and 8 about their respective axis. The device 13 can be manually operable or automatically operable using a motor means. When the gratings 4 and 8 are turned, they are moved in similar or opposite direction about their zero order position.

The collimating lenses 3 and 7 may be substantially the same, and should be of sufficient resolution and quality to provide suitable clear image at the exit slit. Similarly, the focusing means lenses 5 and 9 may be substantially similar, and should be of sufficient resolution and quality to provide a clear image at the exit slit. The housing 1 should be substantially light and dust tight. The interior may be coated black to prevent extraneous light scatter. Extraneous light would tend to interfere with the accurate reproduction of the source image and interfere with the accurate passage of the desired selected wavelength or band of wavelengths. The entrance slit 2, intermediate slit 6, and exit slit 10 are of suitable horizontal and vertical dimensions. The entrance slit 6 must be of sufficient dimensions in both vertical and horizontal dimensions to pass the object image without passing extraneous light. Similarly, exit slit 6 must be of sufficient dimensions in both the horizontal and vertical dimensions to pass the formed final image of the size desired and provided by the focusing lens 9. The intermediate slit should be of sufficient horizontal and vertical dimensions to allow the passage of the image and of the desired band of wavelengths. By suitable selection of the dimensions of the intermediate slit 6, a selected single wavelength or a selected band of wavelengths may be allowed to pass through slit 6 and ultimately appear at the exit slit 10. The minimum dimension would be to permit passage of the image and of a single wavelength, and the maximum dimension would be to permit passage of the image and of a selected band of wavelengths.

The viewer 12 which may be used to view the exit image appearing at the exit slit 10 may be of any suitable device, such as the human eye, TV camera, light sensitive detector, etc. The image will be of a selected single wavelength, or a selected band of wavelengths within the spectrum of wavelengths of the object image. The width of the band of wavelengths will depend upon the dimensions of the intermediate slit as discussed above. The particular wavelength which is selected at the particular band of wavelengths which is selected will depend upon the position of the grating 4 vis-a-vis the entrance and intermediate slits 2 and 6. The viewer 12 will take into consideration whether a single wavelength is viewed or a selected band of wavelengths is viewed. However, any suitable viewer can be used. Similarly, any suitable image producing device 11 can be used to produce the object image at the entrance slit 2. The source image can be monochromatic or polychromatic. Any suitable size reducing device may be used consistent with the band of wavelengths desired to be within the object image.

Advantageously, the invention may be used for all ranges of wavelengths from X-ray to radio waves utilizing suitable components and limited only by the energy of the X-ray on the one side of the spectrum and on the other side of the spectrum by the physical size of the apparatus needed. In the visible range, the invention may be utilized for many different purposes, such as to detect chemical content of a specimen, heat analysis, plasma diagnostics, etc, and in any use wherein bands of wavelengths need to be isolated, observed and measured.

Although the above description lenses and a physical arrangement wherein the light rays being operated upon cross over, other arrangements and devices can be employed, such as for example the lenses may be replaced by suitable mirrors, and the gratings may be arranged on a single rotating shaft on different planes with the lenses appropriately positioned so that a compact apparatus is provided.

Although the theory of the optics would be understood by the worker skilled in the art with only the foregoing description and without further elucidation, the following is set forth for illustrative purposes and is not intended to be limiting of the invention. Reference is made to the light rays diagram in the drawing.

The difference between the exit image and the source image is that of all the wavelengths present in the source image, only part of them is present in the exit image. The total wavelength band which is at the exit image is given by the dispersion:

$$d\lambda/d\beta = (d \cdot \cos \beta)/n \quad (1)$$

and since
$$d\beta = dl/f \quad (2)$$

wherein l is the distance measured in the direction of dispersion on the plane of the intermediate slit 6, and f is the focal length of the lens 5:

$$d\lambda = d\beta \cdot \cos \beta d/n = dl \cdot d \cdot \cos \beta/nf \quad (3)$$

In order for the entire image to appear at the exit slit, it is necessary that $dl > w$, wherein w is the source image width. It is clear from equation (3) that, in order to restrict $d\lambda$, dl (limited by w) and d have to be made small and n and f to be made large. The d is the grating constant namely, the distance between consecutive grooves and n is the order of diffraction.

To show that the angle of incidence at grating 4 must be equal to the angle of diffraction at grating 8, the following is set forth:

The basic equation that relates the angle of incidence $\alpha$ with the angle of diffraction $\beta$ at the grating with a grating constant d (i.e. the distance between two consecutive grooves) is given by:

$$n\lambda = d(\sin \alpha + \sin \beta) \quad (4)$$

wherein $\lambda$ is the wavelength of light and n is the order of diffraction. Angle $\alpha$ and $\beta$ are signed and measured from the grating normal N, $\alpha$ being the angle of incidence and $\beta$ being the angle of diffraction. Therefore, angle $\alpha$ is positive and angle $\beta$ is negative. n may be positive or negative, meaning that there are always two diffraction spectra, one spectrum on each side of the zero order beam.

Since the grating 4 has been rotated by an angle $\gamma$, $\alpha_1 = \alpha_{10} + \gamma$, and $\beta_1 = \beta_{10} - \gamma = \alpha_{10} - \gamma$, since $\alpha_{10} = \beta_{10}$. The wavelength passing through the intermediate slit is given by equation (4). On grating 8, the angle of incidence is $\alpha_2 = \alpha_{10} - \gamma = \beta_1$, and therefore, the angle of diffraction is given by equation (4) solved for $\beta_2$: $\sin \beta_2 = nP\lambda/d - \sin \alpha_2 = n\lambda/d - \sin \beta_1 = \sin \alpha_1$ Therefore $\beta_2 = \alpha_1$.

As previously stated of all the wavelengths emitted by the source image, only those will reach the exit slit that passes through the intermediate slit. If $d\lambda$ is too large, the image position at the intermediate slit will be off axis and blocked off by the slit jaws. The intermediate slit limits the width of the wavelength that is allowed to reach the second grating 8. All of the wavelengths in that band which reaches the second grating 8 are then recombined into as many directions as there are image points, and then lens 9 focuses them into a single image of the source image at the exit slit. There are as many images of the source image on the intermediate slit as there are wavelengths in the source light. If the source is a continuous band of wavelengths, images at the intermediate slit will overlap and form an image blurred in the direction of the wavelength dispersion.

A typical arrangement utilized components having the following measurements. These measurements and components are given only as illustrations and are not intended to be limiting of the invention in any manner.

Focusing lenses: resolution 1.2 $\mu$m.
Collimating lenses: resolution 1.2 $\mu$m.
Gratings: 590 grooves per mm; figure of grating ¼ wavelength (using Mg 564 nm).
Exit Slit: 0.5 mm.
Entrance slit: 0.5 mm.
Intermediate Slit: 2 mm.
Viewer: TV camera.
Objectimager: TV camera lens.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. An apparatus for producing monochromatic images comprising:
   a. an entrance slit whereat an object image is focused,
   b. a first collimating lens means for collimating light imaged at said entrance slit into a first collimated beam,
   c. a first planar grating means positioned along the path of said first collimated beam and physically behind said first collimated lens means so that said first collimated beam will impinge thereon and be diffracted thereby,
   d. a first focusing lens means positioned physically in front of said first planar grating means for focusing diffracted light from said first planar grating means onto a first plane,
   e. an intermediate slit located at said first plane to prevent unwanted light from being projected further,
   f. a second collimating lens means disposed to collimate light diffracted from said first planar grating means and focused by said first focusing lens means on said intermediate slit at said first plane, g. a second planar grating means disposed along the path of the collimated light from said second collimating lens means and facing said first planar grating means so that said light from said second collimating lens means will impinge thereon and be diffracted by said second planar grating means, said diffracted light from said second planar grating means travelling along a path which crosses over said first collimated beam, h. a second focusing lens for focusing the diffracted light from said second planar grating means onto a second plane, i. an exit slit at said second plane where said light from said second focusing lens means is brought to focus, and j. means coupled to said first and second planar grating means for concurrently moving said first and second planar grating means whereby the angle of incidence of the light projected onto said first planar grating means is equal to the angle of diffraction from the said second planar grating means, and whereby said object image appearing at said entrance slit appears accurately and proportionally reproduced at said exit slit and of a selected wavelength or band of wavelength of the total spectrum of wavelengths of said object image.

2. The apparatus of claim 1, wherein said first and second collimating means are substantially the same; and wherein said first and second focusing means are substantially the same; and wherein the first and second grating means are substantially the same.

3. The apparatus of claim 1, wherein said means for concurrently moving, rotates the first and second grating means in opposite or similar directions about axis on the grating ruled surfaces and disposed at the centers thereof, by the same angle from a zero order position, whereby concurrently moving said first and second grating means will produce an exit image of a selected wavelength or band of wavelengths depending upon the angular position of said first grating means vis-a-vis said intermediate slit.

4. The apparatus of claim 1, wherein said intermediate slit is matched to the desired wavelength resolution and the resolution of the entrance slit.

5. The apparatus of claim 1, wherein the wavelength band of said object image is within the visible spectrum.

6. The apparatus of claim 1, wherein said intermediate slit is of sufficient dimensions to pass the object image and to pass a desired band of wavelengths of said object image.

7. The apparatus of claim 1, wherein said means for concurrently moving, moves said first grating means to selectively enable said intermediate slit to pass a selected wavelength or band of wavelengths, and said first and second grating means to cause the angle of incidence of the first grating means to equal the angle of diffraction of the second grating means at all times, and wherein the two grating means are moved in opposite directions in terms of the diffraction order positions.

* * * * *